Jan. 7, 1958
H. H. CHRISTENSEN
2,819,030
COMBINED MANUAL AND AUTOMATIC SERVO APPARATUS
Filed Aug. 30, 1956
2 Sheets-Sheet 1
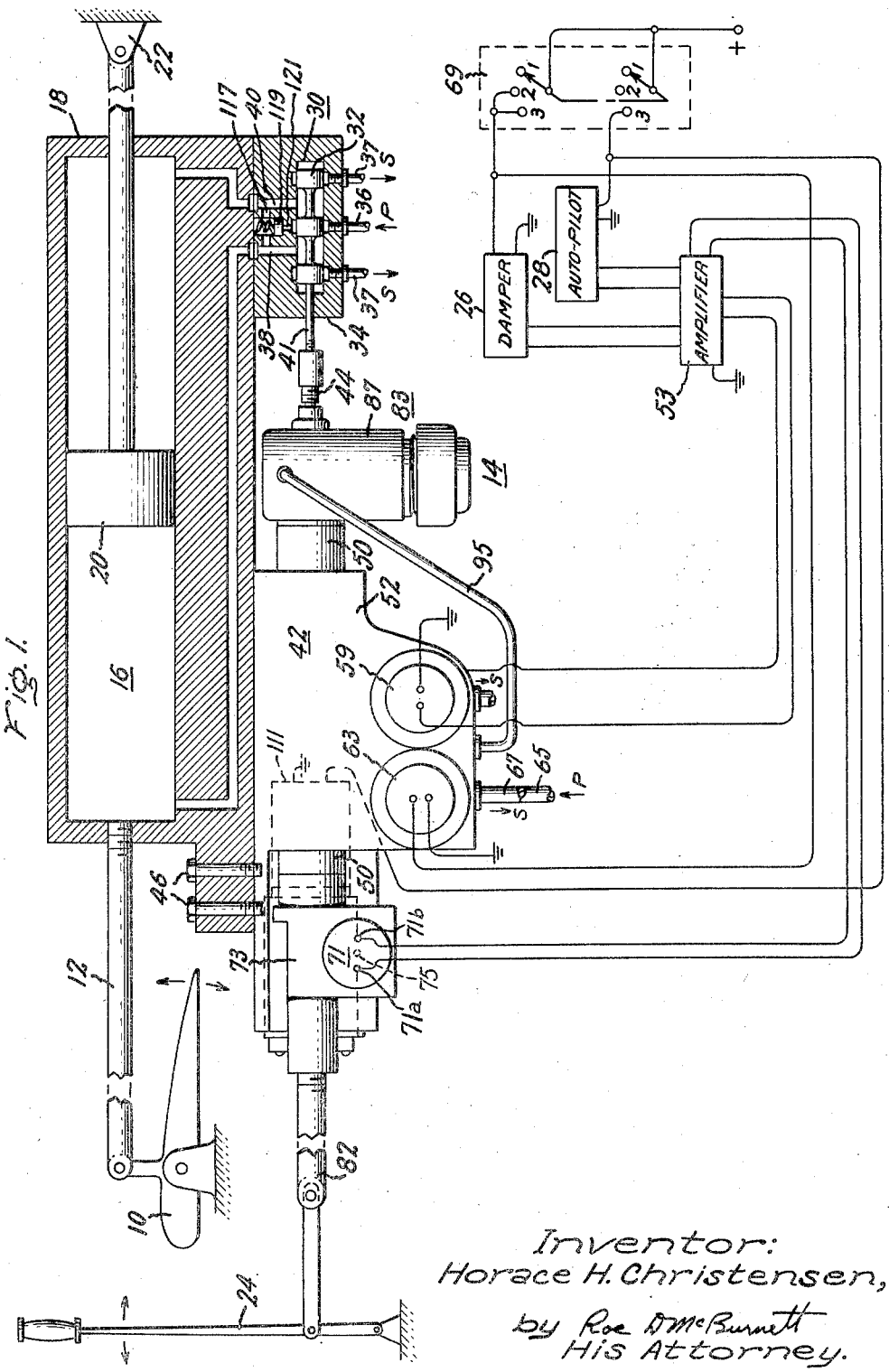
Inventor:
Horace H. Christensen,
by Roe D. McBurnett
His Attorney.

Jan. 7, 1958  H. H. CHRISTENSEN  2,819,030
COMBINED MANUAL AND AUTOMATIC SERVO APPARATUS
Filed Aug. 30, 1956  2 Sheets-Sheet 2
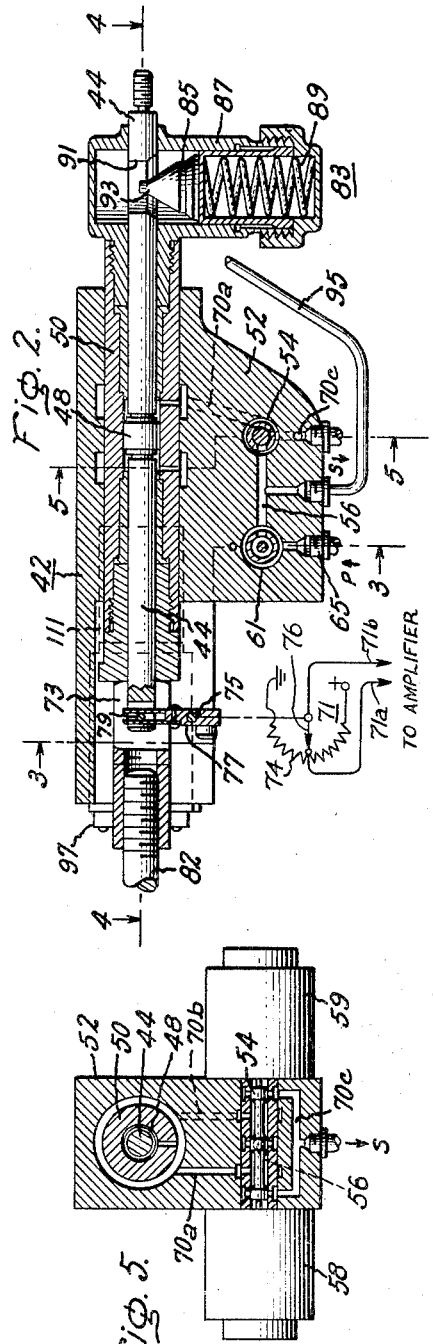
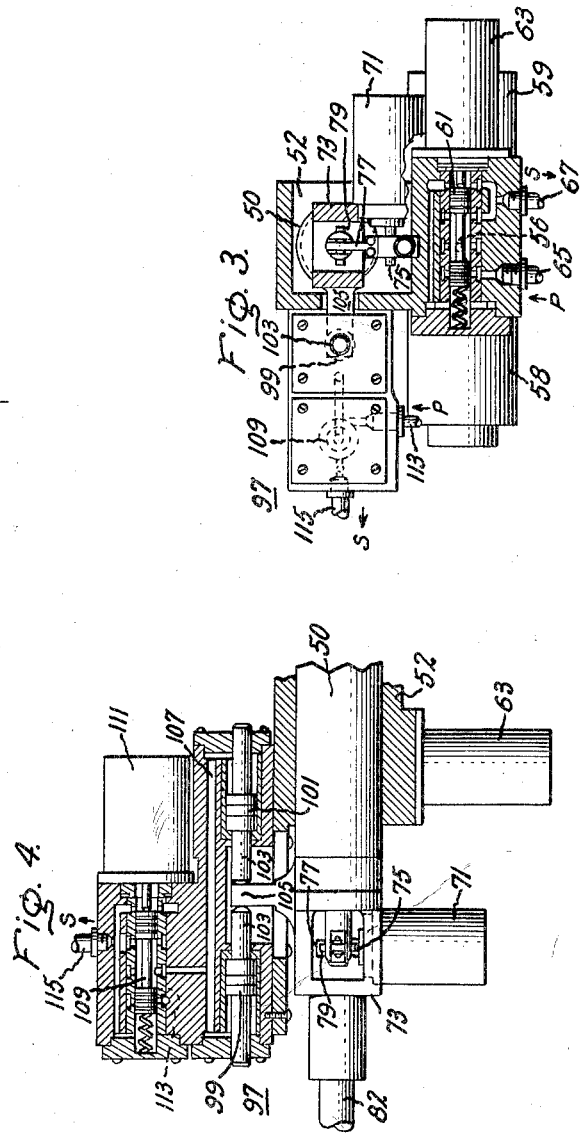
Inventor:
Horace H. Christensen,
by Roe D. McBurnett
His Attorney.

United States Patent Office 2,819,030
Patented Jan. 7, 1958

1

2,819,030

COMBINED MANUAL AND AUTOMATIC SERVO APPARATUS

Horace H. Christensen, Schenectady, N. Y., assignor to General Electric Company, a corporation of New York Application August 30, 1956, Serial No. 607,235

12 Claims. (Cl. 244—76)

This invention relates to combined manual and automatic controlled servo apparatus and more specifically to such apparatus of hydraulic actuated type which is particularly adapted to the combined manual and automatic control of the course and/or attitude of flight of aircraft.

The servo apparatus of the invention is a modification of that disclosed and claimed in copending application Serial No. 465,178, filed October 28, 1954, by J. R. Granan et al. and assigned to the assignee of the instant application. The combined manual and automatic servo apparatus of the Granan et al. application operates to control the attitude or direction of travel of dirigible vehicles in any selected one of a plurality of modes including (1) straight manual, (2) manual with power boost, (3) manual with power boost and automatic damping of transients, and (4) fully automatic responsive to control signals supplied by an autopilot or other control input. If in any of these automatic and power boost modes of operation of the Granan et al. apparatus it becomes necessary for purposes of safety to re-assert manual control, this may readily be accomplished simply by exerting sufficient force on the manual input member, without any preliminary switching operation or other adjustment of the apparatus.

It is the principal objective of the present invention to provide new and improved servo control apparatus of the general type just described, characterized by optimum simplicity and economy of manufacture, maximum flexibility and reliability of operation, and full fail-safe protection.

Another object of the invention is the provision, in combined manual and automatic servo control apparatus, of means for quickly and positively centering certain of the control inputs to the apparatus whereby during manual operation with power boost precision control responsive to position of the manual input is afforded and during automatic operation the position of the manual input accurately reflects the position of the object to be controlled by the apparatus.

A further object of the invention is the provision of combined manual and automatic servo control apparatus capable of operation in any selected one of a number of different modes including straight manual, manual with power boost, stabilized manual with power boost, and fully automatic; conversion between these several modes of operation being quickly and positively effected by means characterized by mechanical simplicity and maximum reliability in service.

It is also an object of the invention to provide improved performance and reliability in combined manual and automatic servo apparatus wherein full fail-safe protection is afforded by means responsive to partial failure of the system power supply to cause conversion of system operation to its manual with power boost mode, and responsive to total failure of the power supply to cause the system to operate in its straight manual mode.

2

In carrying out this invention in one form a combined manual and automatic servo apparatus is provided including a power drive means having a movable output member adapted to be connected to an object to be positioned by the servo apparatus. Control means having two relatively movable members are provided to control the operations of the power drive means. One of the movable members is connected to the movable output member of the power drive means while the second movable member is connected to one of two relatively movable members of a servomotor means. The other movable member of the servomotor means is connected to a manual input signal device. Means are provided for locking the manual input signal device and the other movable element of the servomotor means so as to move in unison with the movable output member of the power drive means. Centering means are provided to center the two movable elements of the servomotor and prevent their movement with respect to each other.

Electrical and hydraulic means are provided to actuate selectively or jointly the locking means and the centering means whereby the movable output member of the power drive means may be operated in various modes such as manual or automatic. Switching means are provided to select the desired mode of operation of the servo apparatus.

My invention will itself be more fully understood and its various objects, features and advantages further appreciated by reference to the appended claims and following detailed specification when read in conjunction with the accompanying drawings, wherein:

Figure 1 is a schematic diagram of combined manual and automatic controlled servo apparatus embodying the invention;

Figure 2 is a longitudinal section through the servo control element of the apparatus of Figure 1 and showing diagrammatically the position feedback element;

Figure 3 is a part-sectional view taken substantially on the line 3—3 in Figure 2;

Figure 4 is a part-sectional view taken substantially on the line 4—4 in Figure 2; and Figure 5 is a part-sectional view taken substantially on the line 5—5 in Figure 2.

With continued reference to the drawings, wherein like reference numerals have been used throughout to designate like elements, the invention is illustrated by way of example as embodied in a flight control system for aircraft. For purposes of brevity, only the aircraft "pitch" control system has been specifically shown and described herein, though as will be understood additional systems generally similar to that shown normally would be employed for control of "yaw" and "roll" motions of the craft.

Referring more particularly to Figure 1, there is shown a flight control surface 10 illustrated schematically as an elevator for controlling "pitch" of the aircraft. Flight control surface 10 is shown connected through suitable linkage 12 to the servo control apparatus designated generally by reference numeral 14. This apparatus includes a power drive servo 16 comprising a hydraulic power piston assembly having its movable element 18 directly coupled to elevator linkage 12 and its stationary element 20 held fixed as by a hanger 22 to any suitable stationary member of the airframe. As will be more fully explained hereinafter, the operation of power drive 16 in positioning elevator 10 may be controlled either by a manual input member 24, by the manual input member with automatic stabilization by superimposed attitude control signals from damper 26, or by an autopilot 28 acting either alone or in cooperation with damper 26.

Since as illustrated the power drive 16 is of hydraulic type, a suitable source of hydraulic fluid under pressure and suitable sump or drain means must be provided. These may be of conventional type and therefore are not specifically illustrated in the drawings. Instead, at the ends of connections to which the hydraulic liquid pressure source is to be connected, the letter symbol "P" is employed with an arrow pointing inwardly. Similarly, the drain line connections for the sump are indicated by the letter symbol "S" together with an outgoing arrow.

Power drive 16 operates under direct control of a pilot valve 30 including a conventional 3-land piston 32 disposed within a housing 34 fixed to the power drive movable element 18. Piston 32 is slideable within housing 34 to alternatively connect hydraulic fluid under pressure supplied through inlet fitting 36 to one of the control lines 38 or 40 leading to opposite sides of the power drive piston 20 and to concurrently connect the other of these control lines to a drain fitting 37, depending on the position of the valve piston with respect to its central null position as shown in the drawing. Operation of pilot valve 30 is by a connecting rod 41 threadedly or otherwise fixedly coupled to the output member 44 of a two-stage servo amplifier designated generally by reference numeral 42 in Figure 1, servo amplifier 42 being fixed to the power drive movable element 18 as by bolts 46 or other suitable means. The internal construction and operation of servo amplifier 42 is best shown in Figures 2–5, to which reference will now be made.

In Figure 2 the servo amplifier 42 is shown as of two-stage hydraulic type. The second or output stage of this amplifier is in the form of a fluid motor including a piston 48 directly connected to output member 44 and slideable axially within a cylinder 50, which in turn is axially slideable within the servo amplifier housing 52. Operation of this output stage servo motor is under control of an input stage pilot valve 54 (Figs. 2 and 5) mounted within servo housing 52 and supplied with hydraulic fluid under pressure through a conduit 56 formed in the housing. Pilot valve 54 is connected to be moved in opposite directions by means of a pair of opposed solenoids 58 and 59 connected to be differentially energized by control signals from a double output amplifier 53 (Fig. 1) controlled by damper 26 either alone or cooperatively with autopilot 28 as will be more fully explained hereinafter. The solenoids 58 and 59 include means (not shown) for normally centering the valve 54 except when moved by one or the other of the solenoids. These solenoids and their centering means may, for example, be of the type disclosed in Patent No. 2,435,817, issued February 10, 1948, to Boynton et al.

Supply line 56 for pilot valve 54 is connected to any suitable source of hydraulic fluid under pressure through a relay valve 61 actuated by a solenoid 63 as best shown in Figure 3. As there shown, valve 61 is operative to permit flow of pressure fluid from an inlet fitting 65 to supply line 56 at times when solenoid 63 is energized, and to connect the supply line 56 to a drain fitting 67 at times when the solenoid 63 is in its de-energized condition. The operation of solenoid 63 is under control of manually operable selector switch means 69 (Fig. 1) which will later be described.

It will be apparent that in the structure thus far described, energization of solenoid 63 is effective to supply pressure fluid through relay valve 61 and thence through supply line 56 to the pilot valve 54. Dependent on the position of pilot valve 54 as determined by the respective states of energization of its associated solenoids 58 and 59, the pilot valve either blocks off supply line 56 or connects it to one or the other of two conduits 70a and 70b leading to opposite sides of the output stage servo piston 48, the other of these two conduits being simultaneously connected to drain through a third conduit 70c to sump. The movement of piston 48 responsive to pressure difference at its opposite sides causes corresponding movement of pilot valve 30 and consequent actuation of power drive 16 in a direction dependent on the direction of displacement of pilot valve 54 by its associated solenoids 58 and 59, to thus position the flight control surface 10 in accordance with the electrical inputs to those solenoids.

It will be noted that the pilot valve 54 and solenoids 58 and 59 are mounted with their axes at right angles to the line of movement of power drive 16. This is of importance because power drive movement is imparted to the servo amplifier housing 52 through the direct mechanical connection between the housing and power drive. If the axes of the pilot valve and its solenoids were in line with this movement, accelerations of the servo amplifier housing by power drive 16 would be regeneratively fed back to the servo amplifier input stage rendering it unstable particularly when the power drive is connected to position an inertia load. In accordance with the invention, this difficulty is simply and effectively obviated by mounting the pilot valve and solenoids with their axes at right angles to the line of movement of the servo amplifier housing.

A position feedback signal indicative of the position of output stage servo piston 48 with respect to its cylinder 50 preferably is provided as by a potentiometer or like transducer 71 which in the illustrated embodiment is mounted to the motor cylinder 50 by means of a bifurcated coupling member 73 fixed to one end of the cylinder. If the transducer 71 is of rotary type as illustrated, the operating shaft 75 thereof may be connected to the output stage piston rod 44 through any suitable reciprocatory-to-rotary motion converter. The converter shown includes an arm member 77 fixed at one end to the transducer shaft 75 and slotted at its other end to engage a pin 79 fixed in piston rod 44. Then, as servo piston 48 moves with respect to its cylinder 50 the shaft 75 of transducer 71 is rotated correspondingly and the transducer produces an electrical feedback signal indicative of the position of the piston within the cylinder. This feedback signal is supplied to amplifier 53 and is there combined with the input signals from damper 26 and autopilot 28, in subtractive relation therewith. The position feedback thus provided serves to close the inner servo loop including the two stages of servo amplifier 42 and either or both the damper and autopilot, for stabilizing the servo.

As diagrammatically shown in Figure 2 the position feedback element is a potentiometer or transducer 71 shown as a variable resistor or potentiometer 74 connected across a voltage source (not shown) and having a movable wiper arm 76 which is rotated by the shaft 75 upon movement of the piston rod 44. The position feedback signal indicative of the position of output stage servo piston 48 is in the form of a voltage taken between the center tap of the potentiometer 74 and the wiper arm 76. This signal is fed from points 71a and 71b as shown in Figure 1 back to the amplifier 53 and is there combined with the input signals from damper 76 and/or the autopilot 28 depending upon the operating mode in which the system is placed.

As best shown in Figures 1, 2 and 4, manual input member 24 includes linkage 82 threadedly or otherwise fixedly connected to the bifurcated coupling member 73 carried by servo motor cylinder 50, so as to provide a positioning connection between the manual input member and servo amplifier output stage as hereinafter more fully explained. Centering means designated generally by reference numeral 83 in Figure 2 are provided for locking the manual input member and servo cylinder 50 in centered relation with respect to servo piston 48 and its piston rod 44, to thus inactivate the servo amplifier output stage during operation of the system in its manual with power boost and straight manual modes.

This centering device 83 may be of the type disclosed in copending application Serial No. 476,257, filed December 20, 1954, by the present applicant and assigned to the assignee of the instant application. As therein described in greater detail, centering device 83 comprises a centering piston 85 slideable within a housing 87 which is mounted to one end of servo motor cylinder 50 and through which piston rod 44 passes. Centering piston 85 is biased upwardly by a compression spring 89, and when forced upwardly by that spring its head portion 93 engages in a slot 91 in piston rod 44 in a manner to center and lock the piston rod with respect to cylinder 50.

The mutually engaging surfaces of piston head portion 93 and slot 91 preferably are shaped to include both straight and beveled portions as shown. Then, as spring 89 moves centering piston 85 upwardly the tapered surfaces on its head portion 93 first engage the correspondingly tapered surfaces of slot 91 to center piston rod 44 and motor piston 48 with respect to motor cylinder 50, and next the straight wall portions of the centering piston and slot engage to provide a positive locking connection capable of transmitting high forces without lost motion, all as more fully described in the aforesaid copending application.

Centering piston 85 may be moved downwardly against the action of spring 89 by hydraulic pressure transmitted to the upper end of piston housing 87 through a line 95 (Figs. 1 and 2) which is connected into supply line 56 between pilot valve 54 and relay valve 61. Thus, whenever relay valve 61 is actuated by energization of its solenoid 63 and transmits pressure fluid to supply line 56, pressure fluid also is transmitted through line 95 to the centering device 83. The fluid there acts to force piston 85 downwardly out of engagement with piston rod 44, thus allowing relative motion between the piston and cylinder constituting the servo amplifier output stage.

In event of electrical system failure, relay valve solenoid 63 is de-energized and cuts off supply of pressure fluid through the relay valve and line 95 to the centering device 83. Loss of hydraulic pressure at centering device 83 either through such electrical system failure or through hydraulic system failure, immediately causes the centering device to center and lock the output stage piston 48 with respect to its cylinder 50. Input signals from manual input member 24 then are positively transmitted directly through the thus locked servo amplifier output stage to the pilot valve 30 of power drive 16, to thus automatically convert to manual with power boost operation under control of the manual input member.

A second centering means, designated generally by reference numeral 97 in Figures 3 and 4, is provided for coupling the servo motor cylinder 50 to the servo amplifier housing 52 during fully automatic operation of the system. As best shown in Figure 4, centering means 97 is mounted on servo housing 52 and comprises a pair of opposed pistons 99 and 101 having piston rods 103 engaging opposed surfaces of a lug 105 integrally formed with or otherwise fixed to motor cylinder 50. Hydraulic fluid under pressure is supplied to both of pistons 99 and 101 in their respective cylinders through a line 107 connected either to a fluid pressure inlet fitting 113 or to a drain fitting 115 dependent on the position of a relay valve 109 actuated by a solenoid 111, which may be of conventional type.

Centering device 97 is operative to positively connect the manual input member 24 and servo motor cylinder 50 directly to servo amplifier housing 52 and, through that housing and power drive 16, to the flight control surface 10. It thus serves to prevent inadvertent injection of manual signals by movement of manual input member 24 during automatic operation, and also serves to make the manual input member accurately follow all movement of the flight control to thus keep the operator informed of system action.

As noted above, the control systems of the invention are designed to be fully fail-safe and to permit immediate assertion of manual control regardless of the mode in which the system happens to be operating at the time.

To this end, the effective areas of the piston 99 and 101 of centering device 97 preferably are so proportioned as to permit the operator to shift the position of manual input member 24 against the centering forces exerted by the two pistons. When this is done, the fluid under pressure behind the one of the pistons which is displaced by the operator is forced backwardly through supply line 107 to the pressure fluid source, against the pressure thereof. The operator thus is able to assert manual control with power boost merely by exerting sufficient pressure on manual input member to overcome the centering device 97 and obtain immediate control of the power drive pilot valve 30.

In all modes of operation it is desirable to permit straight manual control without power boost on failure of the hydraulic pressure fluid supply, and since the power drive unit 16 is directly interposed between manual input member 24 and the flight control surface 10, it is necessary to include means for relieving hydraulic block in the power drive in order to accomplish this desired purpose. Accordingly, a by-pass conduit 117 is formed between the pressure fluid supply passages 38 and 40 connected to opposite ends of the power drive cylinder 18. Flow through this by-pass 117 is controlled by a spring-loaded piston 119 slidable within a cylinder the walls of which intersect the by-pass as shown, one end of the cylinder being connected through a passage 121 to the hydraulic fluid pressure source which supplies pilot valve 30. Whenever pressure fluid is available at the pilot valve then piston 119 is forced upwardly against its spring to close off the by-pass 117, but in case of hydraulic failure piston 119 then is moved downwardly by its loading spring and opens by-pass 117 to permit free flow of hydraulic fluid between opposite ends of the power drive cylinder 18. Therefore, if the pressure fluid supply should fail movement of flight control surface 10 directly by the manual input member is not impeded by the presence of a hydraulic block in the power drive.

With reference again to Figure 1, the manually operable selector switch means 69 is shown in that figure as including a two-bank three-contact switch connected in a manner such that when the switch is in its "1" or "manual" position none of the electrical components of the system are energized and the system operates in its manual with power boost mode; when the switch is in its "2" or "stabilized manual" position then solenoid 63, damper 26 and amplifier 53 all are energized and the system mode of operation converts to manual with power boost and automatic damping for stabilization of transients; and when the switch is in its "3" or "autopilot" position then damper 26, autopilot 28, amplifier 53 and solenoids 63 and 111 all are energized for fully automatic operation responsive to control signals from autopilot 28 and stabilizing signals from damper 26.

*Operation*

For operation manually with power boost but without damping, selector switch means 69 is placed in its "1" position as illustrated in Figure 1. Solenoids 63 and 111 then are unenergized and the relay valves controlled thereby both are in positions such that no pressure fluid is supplied therethrough to either of the two centering devices 83 and 97. Centering device 83 therefore acts to lock together the piston 48 and cylinder 50 of the servo amplifier output stage and thus render it inoperative. Under these conditions, any movement of manual input member 24 is directly communicated to the piston rod 44 of the servo amplifier output stage and to the pilot valve 30 for power drive 16. The power drive then operates under direct control of the manual input member.

The possibility of over-control by the operator is minimized and the control stick action of direct mechanical linkage systems more closely simulated by means of the positioning connection provided between power drive 16 and the housing 34 of its pilot valve 30. Since valve housing 34 is fixed to the power drive movable member 18 and during manual operation the valve piston 32 is fixed to manual input member 24, each movement of the power drive is regeneratively fed back to its pilot valve 30. That is, each movement of the power drive causes a corresponding change in position of pilot valve piston 32 with respect to its housing 34, in the direction opposite to that in which the valve piston was initially displaced to energize the power drive.

In this as well as in the other modes of operation next to be described, manual control without power boost is possible in event of hydraulic failure, control being maintained through one or more of the several mechanical connections always present between the manual input member and flight control surface. The connection relied on for manual control may be either (1) through pilot valve 30 which permits only limited travel of valve piston 32 within its cylinder 34, or (2) through the centering device 97 which, irrespective of whether energized or not, still permits only a limited amount of relative movement between the servo amplifier housing 52 and cylinder 50. Regardless of which of these possible means of connection is chosen to be relied upon, the parts through which it is to be effected may be dimensioned to allow sufficiently little lost motion in the connection that satisfactory control of the aircraft may be maintained by manual input member 24 directly.

For stabilized manual operation responsive to movement of manual input member 24 and superimposed stabilization signals from damper 26, switching means 69 is placed in its "2" position so as to energize damper 26, amplifier 53 and solenoid 63. Energization of solenoid 63 is effective to actuate relay valve 61 and permit flow of pressure fluid to the servo amplifier input stage pilot valve 54, the solenoids 58 and 59 for this valve then being differentially energized by damper 26 through input amplifier 53. Energization of the relay valve solenoid 63 is of course also effective to supply fluid under pressure to centering means 83 and unlock the servo output stage piston 48 from its cylinder 50. Since this piston 48 moves with cylinder 50 in the absence of any corrective signals supplied by damper 26 to the servo input stage, movements of manual input member 24 are in effect directly transmitted through piston rod 44 to the power drive pilot valve 30 except when damper 26 operates to superimpose on the manual input member movement additional and corrective movements of piston 48 with respect to its cylinder 50. These corrective signals are effective to compensate for gusts and other transient disturbances, for stabilizing the aircraft flight path.

During operation in the stabilized manual mode, the position feedback element 71 supplies a signal indicative of the movement of servo output stage piston 48 with respect to its cylinder 50, for completing the inner servo loop including damper 26, amplifier 53 and the servo input stage 54. Position feedback for the outer servo loop, which includes power drive 16, is in effect provided by the aircraft itself since any change in its attitude or course is reflected as a change in the output signals from damper 26.

When system operation is to be under control of the autopilot or other source of automatic control signals, selector switch means 69 is placed in its "3" position to energize damper 26, autopilot 28 and input amplifier 53, and also to energize both of the solenoids 63 and 111. Servo amplifier 42 then operates in essentially the same manner as in the "stabilized manual" mode just described, except that its operation is responsive not only to stabilizing signals from damper 26 but also to control signals from autopilot 28, the stabilizing and control signals being mixed in input amplifier 53 prior to their transmission to servo input stage solenoids 58 and 59.

On energization of the solenoid 111, centering means 97 is actuated by pressure fluid supplied through valve 109 to the outer ends of pistons 103, driving both of the pistons inwardly. When this occurs, all movement of flight control surface 10 and its power drive 16 is directly transmitted to manual input member 24 through the centering means. The operator therefore is able to accurately follow all movement of the aircraft control surfaces even when the system is operating in its fully automatic mode. At the same time, since centering means 97 exerts only a limited force on the manual input member, the pilot may manually inject any desired corrective signal into the power drive simply by exerting sufficient force on the manual input member, one or the other of the centering pistons 99 and 101 being displaced as necessary to permit application of the corrective signal to the pilot valve 30 of power drive 16.

As previously explained, failure of the electrical system will immediately cause reversion of system operation to manual with hydraulic power boost, and failure of the hydraulic system causes reversion to straight manual operation. In either case, the operator may even prior to the time the necessary change in system operation is fully completed, always maintain manual control through the lost motion connections hereinbefore explained.

From the foregoing it will be apparent that the control systems of the invention provide optimum simplicity of construction and economy of manufacture, and afford maximum flexibility and reliability of operation and full fail-safe protection. While only one preferred embodiment of the invention has been described and illustrated by way of example, many modifications will occur to those skilled in the art and it therefore should be understood that the appended claims are intended to cover all such modifications as fall within the true spirit and scope of the invention.

What I claim as new and desire to secure by Letters Patent of the United States is:

1. Combined manual and automatic servo apparatus comprising power drive means including a movable output member arranged for connection to an object to be positioned by the apparatus, control means including first and second relatively movable members and operatively responsive to relative movement between said members to control operation of said power drive means, said control means first member being fixed with respect to said power drive output member and said control means second member being relatively movable with respect thereto, a servo motor including first and second relatively movable elements with said first element being fixed to said control means second member, a manual input member fixed to said servo motor second element, automatic signal input means arranged to control operation of said servo motor, means operable to center said manual input and said servo motor second element with respect to said power drive output member during one mode of operation of the system, and means operable to center said servo motor first element with respect to said servo motor second element during another mode of operation of the system.

2. Combined manual and automatic servo apparatus comprising power drive means including a movable output member arranged for connection to an object to be positioned by the apparatus, control means including first and second relatively movable members and operatively responsive to relative movement between said members to control operation of said power drive means, said control means first member being fixed with respect to said power drive output member and said control means second member being relatively movable with respect thereto, a servo motor including first and second relatively movable elements with said first element being fixed to said control means second member, a manual input member fixed to said servo motor second element, automatic signal input means arranged to control operation of said servo motor, position feedback means connected to sense displacement between the relatively movable elements of said servo motor and to supply a feedback signal indicative thereof to said automatic signal input means, means operable to center said manual input and said servo motor second element with respect to said power drive output member during one mode of operation of the system, and means operable to center said servo motor first element with respect to said servo motor second element during another mode of operation of the system.

3. Combined manual and automatic servo apparatus comprising power drive means including a movable output member arranged for connection to an object to be positioned by the apparatus, control means including first and second relatively movable members and operatively responsive to relative movement between said members to control operation of said power drive means, said control means first member being fixed with respect to said power drive output member and said control means second member being relatively movable with respect thereto, a servo motor including first and second relatively movable elements with said first element being fixed to said control means second member, a manual input member fixed to said servo motor second element, automatic signal input means arranged to control operation of said servo motor, first centering means operable to center said manual input and said servo motor second element with respect to said power drive output member during one mode of operation of the system, and second centering means operable to center said servo motor first element with respect to said servo motor second element during another mode of operation of the system, the centering forces exerted by said first centering means when operative being of limited magnitude so as to permit assertion of manual control by movement of said manual input member in opposition to the centering effect of the centering means.

4. Combined manual and automatic servo apparatus comprising power drive means including a movable output member arranged for connection to an object to be positioned by the apparatus, control means including first and second relatively movable members and operatively responsive to relative movement between said members to control operation of said power drive means, said control means first member being fixed with respect to said power drive output member and said control means second member being relatively movable with respect thereto, a servo motor including first and second relatively movable elements with said first element being fixed to said control means second member, a manual input member fixed to said servo motor second element, automatic signal input means arranged to control operation of said servo motor, first centering means operable to center said manual input and said servo motor second element with respect to said power drive output member during one mode of operation of the system, and second centering means operable to center said servo motor first element with respect to said servo motor second element during another mode of operation of the system, said second centering means including actuating means operative to disable the centering means when connected to be energized by the system power supply and operative to actuate the centering means when not thus energized by said power supply whereby system power failure may effect operation of the centering means.

5. Combined manual and automatic servo apparatus comprising power drive means including a movable output member arranged for connection to an object to be positioned by the apparatus, control means including first and second relatively movable members and operatively responsive to relative movement between said members to control operation of said power drive means, said control means first member being fixed with respect to said power drive output member and said control means second member being relatively movable with respect thereto, a servo motor including first and second relatively movable elements with said first element being fixed to said control means second member, a manual input member fixed to said servo motor second element, electrically energized automatic signal input means arranged to control operation of said servo motor, means operable to center said manual input and said servo motor second element with respect to said power drive output member during one mode of operation of the system, and means operable to center said servo motor first element with respect to said servo motor second element during another mode of operation of the system, said second centering means including electrically actuated means dependent on the system electrical power supply for rendering the centering means inoperative and responsive to failure of the electrical power supply to render the centering means operative.

6. Combined manual and automatic hydraulic servo apparatus comprising hydraulically actuated power drive means including a movable output member arranged for connection to an object to be positioned by the apparatus, a pilot valve including a first valve element relatively fixed with respect to said power drive output member and a second valve element relatively movable with respect thereto, said pilot valve being connected to control operation of said power drive by control of hydraulic pressure supply thereto, a servo motor including two relatively movable elements each also movable relative to said power drive output member, one of said servo motor elements being fixed to said pilot valve movable element, a manual input member fixed to the other of said servo motor elements, automatic signal input means arranged to control operation of said servo motor, first centering means operative to center said manual input and said servo motor other element with respect to said power drive output member during one mode of operation of the system, and second centering means operative to center said servo motor elements with respect to each other during another mode of operation of the system, said second centering means including hydraulically actuated means dependent on the system hydraulic pressure supply for rendering the centering device inoperative and responsive to hydraulic pressure failure to render the centering means operative.

7. Combined manual and automatic hydraulic servo apparatus comprising hydraulically actuated power drive means including a movable output member arranged for connection to an object to be positioned by the apparatus, a pilot valve including a first valve element relatively fixed with respect to said power drive output member and a second valve element relatively movable with respect thereto, said pilot valve being connected to control the operation of said power drive by control of hydraulic pressure supply thereto, a servo motor including two relatively movable elements each also movable relative to said power drive output member, one of said servo motor elements being fixed to said pilot valve movable element, a manual input member fixed to the other of said servo motor elements, electrically energized automatic signal input means arranged to control operation of said servo motor, first centering means operable to center said manual input and said servo motor other element with respect to said power drive output member during one mode of operation of the system, and second centering means operable to center said servo motor elements with respect to each other during another mode of operation of the system, said second centering means including actuating means dependent on both the system electrical power supply and the system hydraulic power supply for rendering the centering device inoperative and responsive to failure of either of said system power supplies to render the centering means operative.

8. In a combined manual boost and automatic positioning system, power drive means including a movable output member arranged for connection to a control member adapted to be positioned by the system, control means including first and second relatively movable members and operatively responsive to relative movement between said members to control operation of said power drive means, said control means first member being fixed with respect to said power drive output member and said control means second member being relatively movable with respect thereto, a manual input member, a servo motor including first and second relatively movable motor elements with said first motor element being fixed to said control means second member and said second motor element being fixed to said manual input member, automatic signal means arranged to control operation of said servo motor, a first centering means operable to center said manual input and said servo motor second element with respect to said power drive output member during automatic control operation of the system, and a second centering means operable to center said motor first and second elements with respect to each other during manual operation of the system, whereby during operation in the automatic mode said manual input member may be centered with respect to said power drive output member and said power drive control means placed under control of said servo motor as energized by said automatic signal input and during operation in manual modes said servo motor may either be centered to place said power drive control means under exclusive control of said manual input member or may remain operative to superimpose an automatic control input on the manual input.

9. In a combined manual boost and automatic positioning system, power drive means including a movable output member arranged for connection to a control member adapted to be positioned by the system, control means including first and second relatively movable members and operatively responsive to relative movement between said members to control operation of said power drive means, said control means first member being fixed with respect to said power drive output member and said control means second member being relatively movable with respect thereto, a manual input member, a servo motor including first and second relatively movable motor elements with said first motor element being fixed to said control means second member and said second motor element being fixed to said manual input member, automatic signal means arranged to control operation of said servo motor, a first centering means operable when energized to exert a force of limited magnitude tending during automatic control operation of the system to center said manual input and said second motor element with respect to said power drive output member and a second centering means operable to center said first and second motor elements with respect to each other during manual operation of the system, whereby during operation in the automatic mode said manual input member may be centered with respect to said power drive output member and said power drive control means placed under control of said servo motor as energized by said automatic signal input and during operation in manual modes said servo motor may either be centered to place said power drive control means under exclusive control of said manual input member or may remain operative to superimpose an automatic control input on the manual input.

10. In a servo system for effecting control of a steerable craft in any of several modes including manual, damped manual and full automatic; power drive means including a movable output member connected to position the steering member of said craft; control means including first and second relatively movable members and operatively responsive to relative movement between said members to control operation of said power drive, said control means first member being fixed with respect to said power drive output member and said control means second member being relatively movable with respect thereto; a manual input member; a servo motor including first and second relatively movable motor elements with said first element being fixed to said control means second member and said servo motor second element being fixed to said manual input; automatic control signal means including automatic pilot apparatus and automatic damping apparatus operative to produce control signals indicative respectively of long term and transient steering error; means responsive to either or both said automatic control signals selectively to control the operation of said servo motor; means operable when actuated to center said manual input and said servo motor second element with respect to said power drive output member; means operable when actuated to center said servo motor relatively movable elements with respect to each other; selector switch means settable in manual, damped manual and full automatic positions; and means controlled by said selector switch means operative to disable said first centering means and actuate said second centering means when said switch means is in its manual position, to disable both said centering means when said switch means is in its damped manual position, and to actuate said first centering means and disable said second centering means when said switch means is in its full automatic position.

11. In a combined manual and automatic control system for controlling movement of a steerable craft in any of several modes including manual, damped manual and full automatic, hydraulic power drive means including a movable output member connected to position the steering member of said craft, pilot valve means including a first valve element relatively fixed with respect to said power drive output member and a second valve element relatively movable with respect thereto, said pilot valve being connected to control the positioning operation of said power drive, electrically energized automatic control signal means including automatic pilot apparatus and automatic damping apparatus operative to produce control signals indicative respectively of long term and transient steering error, a manual input member, a servo motor including control means responsive to said automatic control signal means and further including relatively movable motor elements the first of which is fixed to said pilot valve movable element and the second of which is fixed to said manual input member, first centering means operable when energized to center said manual input member and said servo motor second element with respect to said power drive output member, electrically and hydraulically actuated second centering means operative except when supplied with both hydraulic and electric power to center said servo motor relatively movable elements with respect to each other, selector switch means settable in manual, damped and automatic pilot positions, and means controlled by said selector switch means operative to de-energize said first centering means and to cut off supply of hydraulic and electrical power to said second centering means when the selector switch is in its manual position, to de-energize said first centering means and supply hydraulic and electrical power to said second centering means when the selector switch is in its damped manual position, and to energize said first centering means and supply hydraulic and electrical power to said second centering means when the selector switch is in its autopilot position.

12. In a combined manual boost and automatic positioning system, power drive means including a movable output member arranged for connection to a control member adapted to be positioned by the system, control means including first and second relatively movable members and operatively responsive to relative movement between said members to control operation of said power drive means, said control means first member being fixed with respect to said power drive output member and said control means second member being relatively movable with respect thereto, a manual input member, a servo motor including first and second relatively movable motor elements with said first motor element being fixed to said control means second member and said second motor element being fixed to said manual input member, automatic signal means arranged to control operation of said servo motor, centering means operable to center said manual input and said servo motor second element with respect to said power drive output member during automatic control operation of the system, locking means operable to lock said first and second motor elements with respect to each other during manual operation of the system, and means operable when energized to unlock said locking means, whereby during operation in the automatic mode said manual input member may be centered with respect to said power drive output member and said power drive control means placed under exclusive control of said servo motor and during operation in manual modes said servo motor may either be locked to place said power drive control means under exclusive control of said manual input member or may be unlocked to permit the servo motor to superimpose its automatic control input onto the manual input.

No references cited.